Nov. 24, 1959   A. W. BROWN   2,914,194
OUTRIGGER CONSTRUCTION FOR CARRIER MOUNTED CRANES
Filed Aug. 21, 1957   5 Sheets-Sheet 2

INVENTOR.
ARCHER W. BROWN
BY
Braddock and Braddock
ATTORNEYS

INVENTOR.
ARCHER W. BROWN
BY
Braddock and Braddock
ATTORNEYS

Nov. 24, 1959 A. W. BROWN 2,914,194
OUTRIGGER CONSTRUCTION FOR CARRIER MOUNTED CRANES
Filed Aug. 21, 1957 5 Sheets-Sheet 4
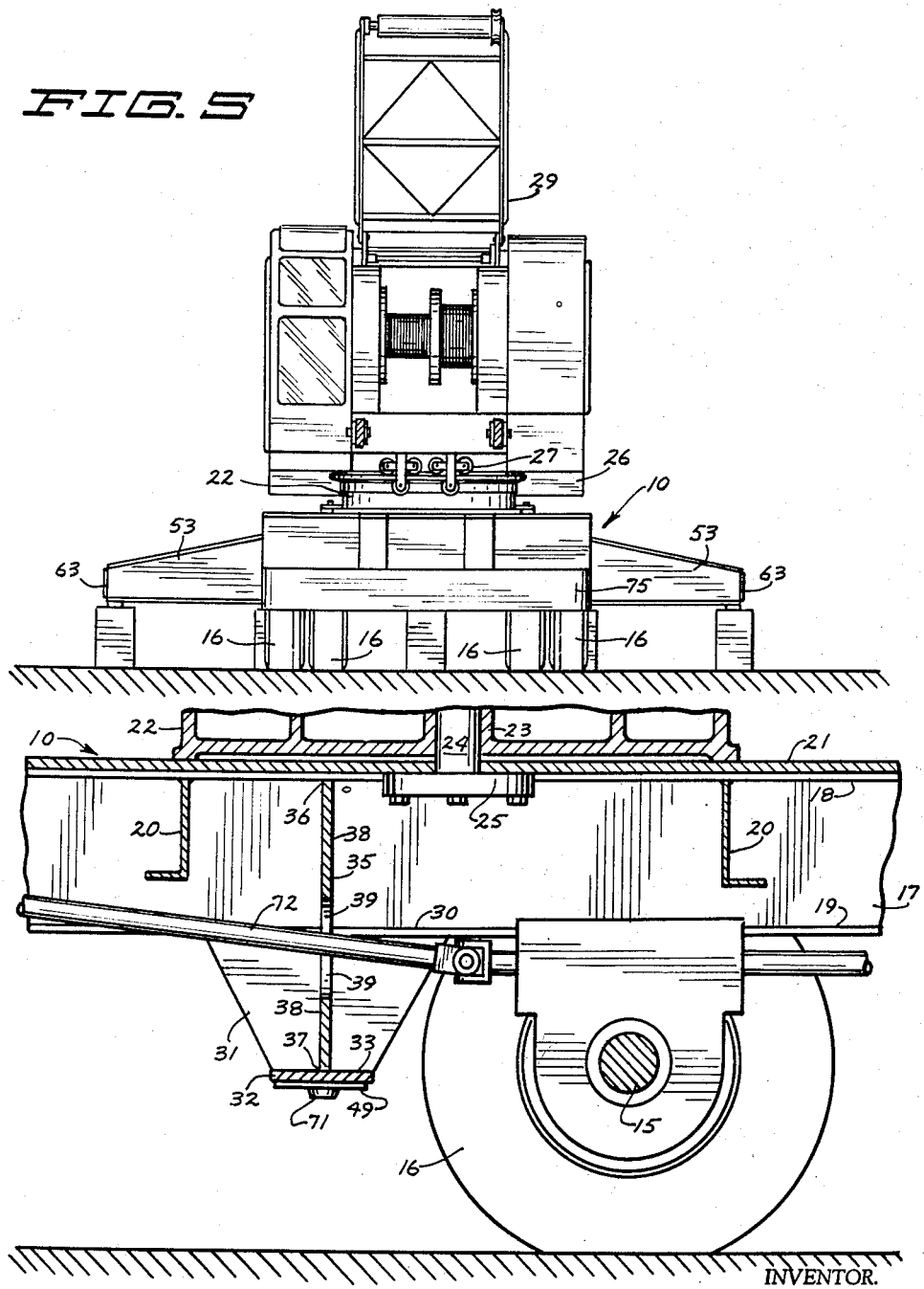
INVENTOR.
ARCHER W. BROWN
BY
Braddock and Braddock
ATTORNEYS Nov. 24, 1959 — A. W. BROWN — 2,914,194
OUTRIGGER CONSTRUCTION FOR CARRIER MOUNTED CRANES
Filed Aug. 21, 1957 — 5 Sheets-Sheet 5

INVENTOR.
ARCHER W. BROWN
BY
Braddock and Braddock
ATTORNEYS

Patent 2,914,194

2,914,194
OUTRIGGER CONSTRUCTION FOR CARRIER MOUNTED CRANES

Archer W. Brown, Minneapolis, Minn., assignor to American Hoist & Derrick Company, St. Paul, Minn., a corporation of Delaware Application August 21, 1957, Serial No. 679,418

2 Claims. (Cl. 212—145)

The invention herein has relation to a carrier mounted crane equipped with outrigger construction.

The object of the invention is to provide outrigger construction for use upon carrier mounted cranes which will incorporate novel and advantageous features and characteristics adapted to render the outrigger construction an improvement generally over devices for the same general purpose heretofore known.

In the accompanying drawings forming a part of this specification,

Fig. 5 is an enlarged rear elevational view of the carrier mounted crane as it would appear from the right in Fig. 1;

Fig. 6 is a vertical longitudinal sectional view, taken as on line 6—6 in Fig. 4.

Figure 1:
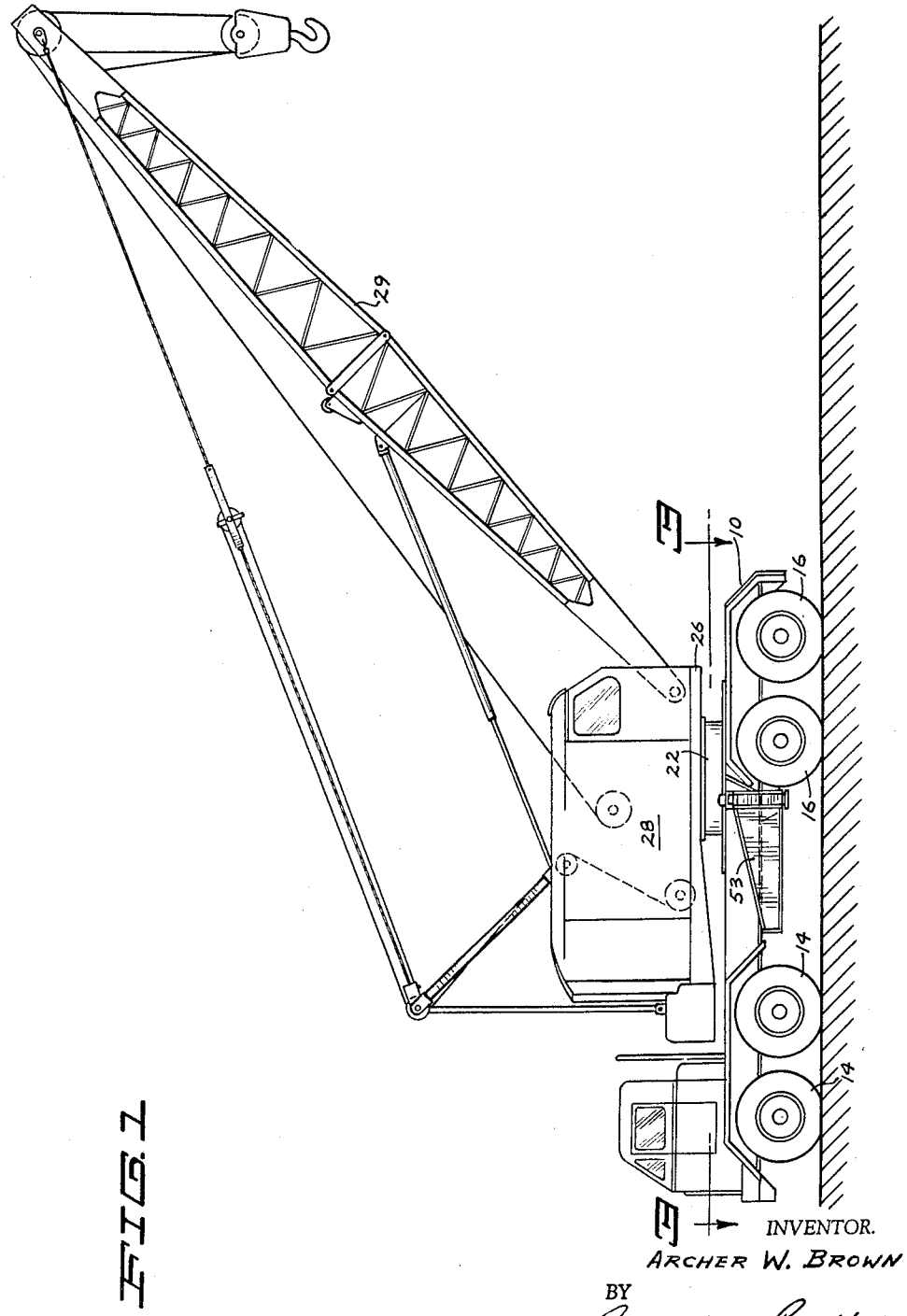
Fig. 1 is a side elevational view of a carrier mounted crane equipped with outrigger construction made according to the invention.
Figure 2:
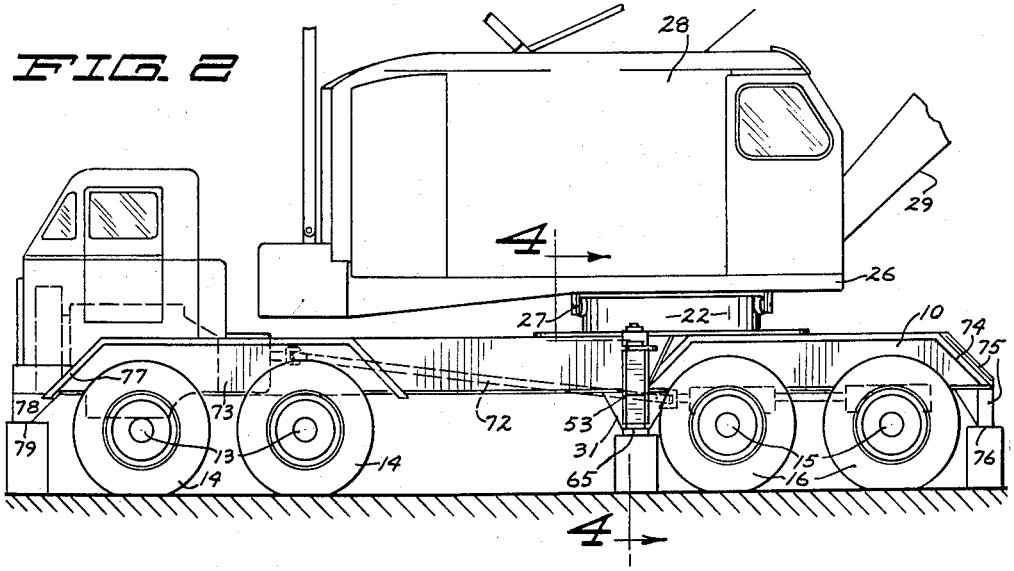
Fig. 2 is an enlarged view corresponding generally with the disclosure of Fig. 1.
Figure 3:
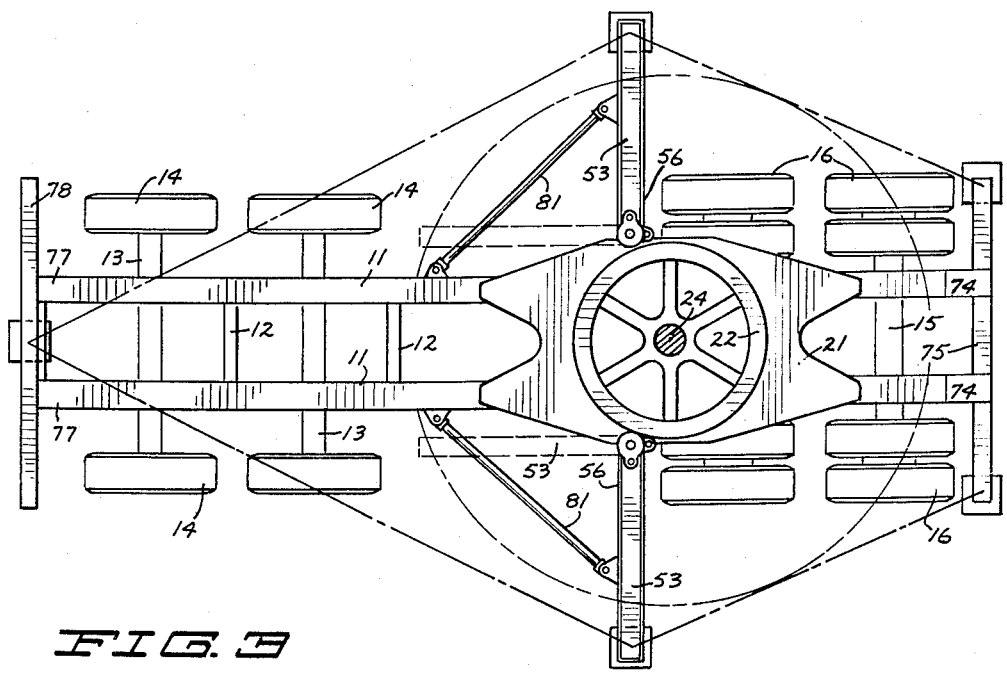
Fig. 3 is an enlarged horizontal sectional view, taken substantially on line 3—3 in Fig. 1.
Figure 4:
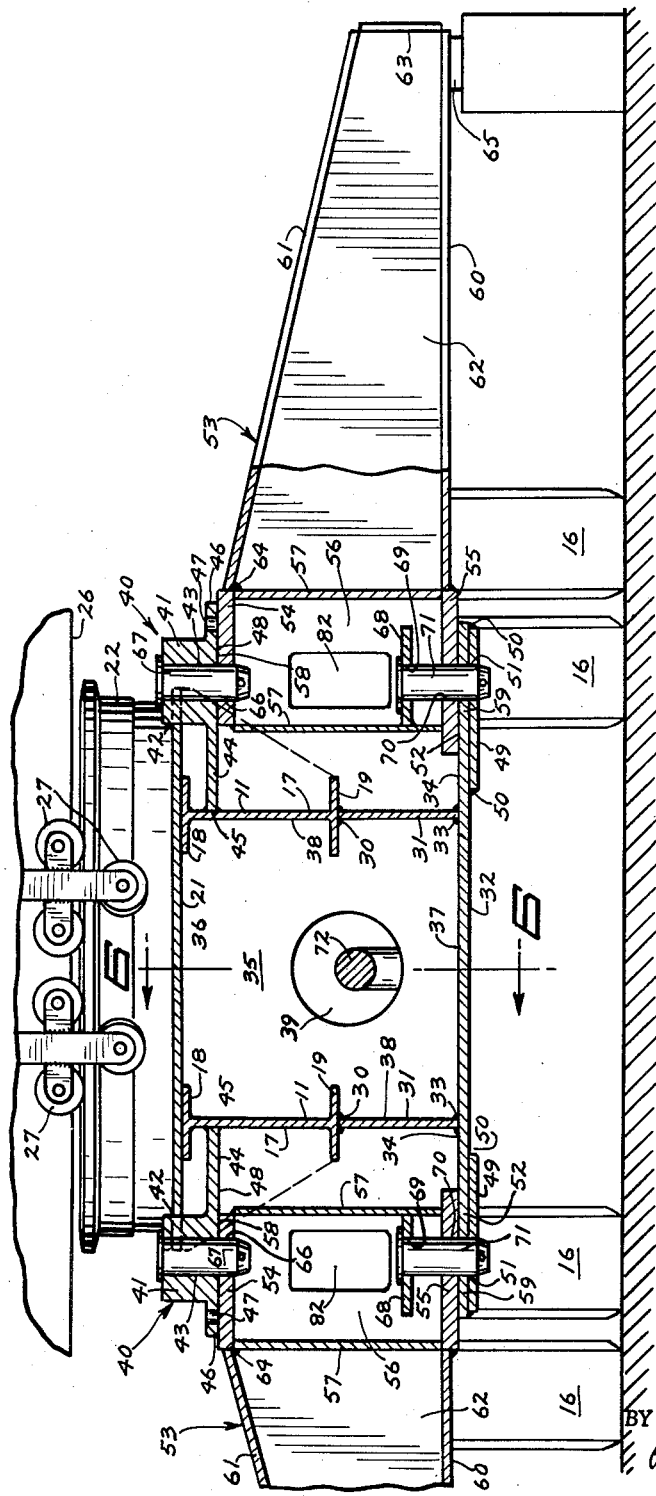
Fig. 4 is an enlarged vertical transverse sectional view, taken substantially on line 4—4 in Fig. 2.
Figure 7:
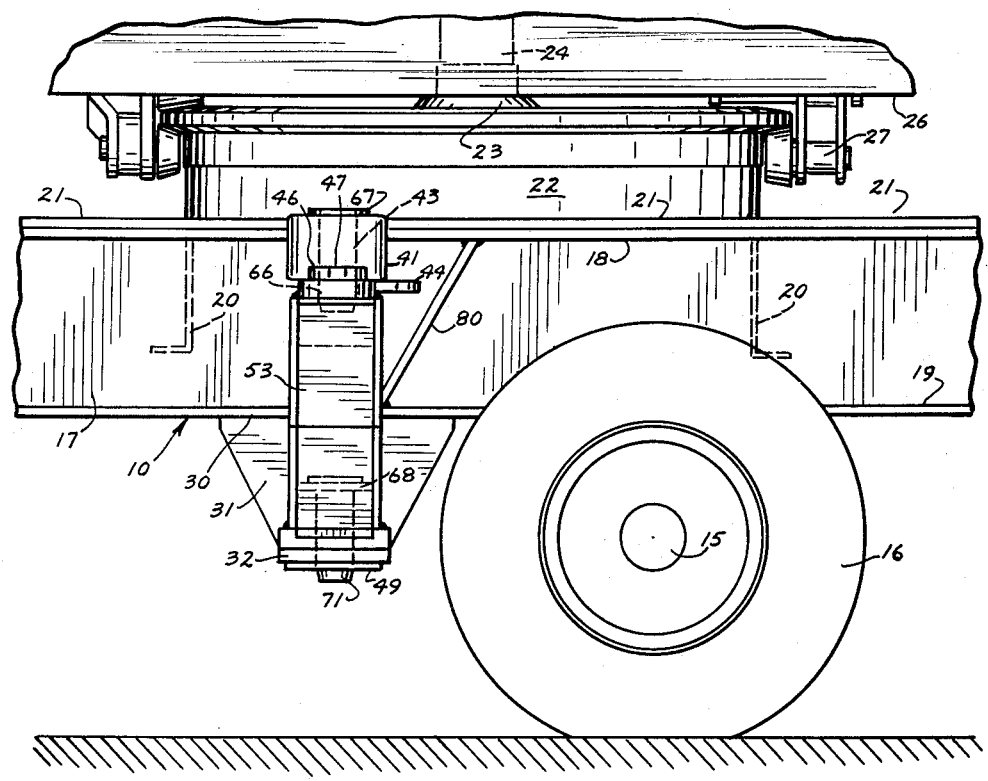
Fig. 7 is a side elevational view of the disclosure of Fig. 6.

A horizontal frame 10 of the carrier mounted crane includes spaced, parallel, longitudinal members, each denoted 11, which extend from end to end of said frame and spaced, transverse members 12 which connect the longitudinal members 11.

Front transverse axles 13 support front wheels 14, and rear transverse axles 15 support rear wheels 16. The front and rear axles 13 and 15 are at the front and rear, respectively, of the frame 10 in spaced relation to each other and suitably and conveniently support said frame. The wheels 14 and 16 are at opposite sides, respectively of the frame in spaced relation to its longitudinal members 11, and the rear axles and wheels are to be driven.

Each of the longitudinal members 11 of the frame 10 is constituted as an I-beam including a vertical body 17 and horizontal flanges, denoted 18 and 19, respectively, at the upper and lower sides of the vertical body. Each vertical body 17 is of considerably greater width than are the horizontal flanges 18, 19 thereon, and said horizontal flanges are of equal width and in parallel relation. Spaced, parallel, transverse reinforcing plates, each represented 20, extend between and are welded to the longitudinal members of the frame. As shown, a rearward reinforcing plate is in the vertical plane of the forward set of rear wheels and a forward reinforcing plate is situated at the front of said vertical plane in spaced relation thereto. A horizontal floor plate 21 of the frame 10 rests upon and is welded to the upper surfaces of the horizontal upper flanges 18 of the longitudinal members 11 of said frame. As disclosed, the floor plate 21 is in overlying relation to the reinforcing plates 20 and extends longitudinally to position both forwardly and rearwardly of said reinforcing plates, and said floor plate extends transversely to position beyond the horizontal upper flange 18 at each side of the frame.

An annular bull gear 22 rests centrally upon and is welded to the upper surface of the floor plate 21. As shown, the bull gear is of diameter equal to a measurement representing the distance between the reinforcing plates 20, as well as approximately equal to the width of said floor plate, and forward and rearward edge portions of said bull gear are in vertical alinement with said reinforcing plates.

A hollow upright or standard 23 of the bull gear 22 provides a vertical cylindrical opening disposed centrally of said bull gear for receiving a vertical shaft 24 extending upwardly from the frame 10. Said vertical shaft is retained in fixed relation to said frame and the bull gear through the medium of a block 25 upon and rigid with the lower end of the vertical shaft and means securing an upper surface of said block to and against a lower surface of the floor plate 21.

A circumferential portion of a revolvable platform or deck 26 of the crane includes conveniently mounted upper and lower rollers, indicated generally at 27, spaced about said platform or deck and concentric with a vertical opening therein which snugly and rotatably receives the vertical shaft 24. The upper and lower rollers 27 are assembled with and ridable over the bull gear 22 in a well known manner. The platform or deck supports a cab 28, a boom 29 and a power plant for actuating operative elements of the crane, as well as for causing said platform or deck to be revolved on the frame 10.

An intermediate portion of the lower surface of the horizontal lower flange 19 of each longitudinal member or I-beam 11 of the frame 10 of the crane fixedly supports, as by welding at 30, a downwardly extending flat plate or piece 31 in vertical alinement with the vertical body 17 of the corresponding longitudinal member or I-beam. The flat plates or pieces are situated beneath an intermediate portion of the bull gear 22 and a trifle forwardly of the forward rear wheels in transverse alinement, and said flat plates or pieces are of duplicate construction. Horizontal upper edges of the flat plates or pieces 31 are longer than are horizontal lower edges thereof, and opposite side edges of each flat plate or piece are straight and converge downwardly in equal angular relation to the horizontal upper and lower edges thereof. A horizontal base plate 32 of the frame 10 is welded, at 33, to the lower edges of the plates or pieces 31. The base plate 32 extends transversely of the frame 10 and is of uniform width. Forward and rearward side edges of said base plate terminate flush with the opposite ends, respectively, of the horizontal lower edges of said flat plates or pieces, and opposite end portions, each denoted 34, of the base plate extend to position outwardly of the flat plates or pieces, at either side of the frame 10. As shown, the opposite end edges of said base plate terminate in vertical planes disposed exteriorly of vertical planes including the opposite side edges of the floor plate 21.

A rectangular plate or panel 35 of the frame extends transversely thereof in vertical alinement with the longitudinal center of the base plate 32. A horizontal upper edge of said rectangular plate or panel is welded, at 36, to a lower surface of the floor plate 21, a horizontal lower edge of the rectangular plate or panel is welded, at 37, to an upper surface of the base plate 32, and vertical opposite side edges of said rectangular plate or panel are welded, at 38, to internal surfaces of the longitudinal members or I-beams 11 and flat plates or pieces 31 at the opposite sides, respectively, of the frame 10. An opening through the rectangular plate or panel 35, equidistantly spaced from said longitudinal members or I-beams and flat plates or pieces and at closer relation to the base plate 32 than to the floor plate 21, is represented 39.

Upper anchoring members, each indicated 40, upon the frame 10 are situated at opposite sides of the floor plate 21 in transverse alinement with each other in the same horizontal plane and in the vertical plane of the rectangular plate or panel 35, the flat plates or pieces 31 and the base plate 32. The anchoring members 40 are of duplicate construction. Each include a hub 41 welded, at 42, to an end portion of the floor plate at the same side of the frame and providing a vertical opening 43 disposed centrally of the hub. A horizontal flange member 44 integral with each hub extends interiorly therefrom in spaced, parallel relation to said floor plate, and an interior end surface of each horizontal flange member is welded, at 45, to an adjacent surface of the vertical body 17 of the longitudinal member or I-beam 11 at the same side of said frame. An ear 46 integral with each hub 41 is situated exteriorly thereof and provided with a vertical aperture 47. As disclosed, the vertical openings and apertures 43 and 47 are in transverse alinement, and said apertures are at closer relation to the hubs 41, respectively, than are the vertical bodies 17 of the longitudinal members or I-beams 11. Together, the hub 41, the flange member 44 and the ear 46 of each upper anchoring member 40 provide a flat, downwardly facing, horizontal surface 48.

Reinforcing plates, each represented 49, are welded, at 50, to horizontal lower surfaces of the opposite end portions 34 of the base plate 32. Each base plate end portion 34 and the reinforcing plate 49 integral therewith constitute a lower anchoring member integral with the frame 10. The lower anchoring members are in transverse alinement and in the same horizontal plane. Each provides a vertical opening 51 in alinement with the vertical opening 43 at the same side of said frame. Each base plate end portion 34 has a flat, upwardly facing, horizontal surface 52 in spaced relation to and vertical alinement with the flat, downwardly facing, horizontal surface 48 of the upper anchoring element 40 at the corresponding side of the frame. The flat, upwardly facing, horizontal surfaces 52 of the base plate end portions 34 are in a single plane parallel to a plane including the flat, downwardly facing, horizontal surfaces 48 of the upper anchoring members 40.

Outriggers, each designated 53, for the carrier are at opposite sides thereof. The outriggers 53 are of duplicate construction. Each is constituted as a box-like member to be hingedly or pivotally mounted on the frame 10 between the upper and lower anchoring members at the same side of said frame and an elongated member projecting exteriorly from said box-like member. Each box-like member is composed of horizontal upper and lower walls denoted 54 and 55, respectively, front and rear walls, each indicated 56, and opposite side walls, each represented 57. All of the walls of each box-like member are in meeting and joined relation and the upper and lower walls 54 and 55 of each box-like member are parallel. Horizontal upper and lower surfaces, represented 58 and 59 respectively, of the upper and lower walls of the box-like member of each outrigger 53 are spaced apart a distance to be snugly fitted between and in engaged relation with the downwardly and upwardly facing surfaces 48 and 52, respectively, of the upper and lower anchoring members at the corresponding side of the crane. The elongated member of each outrigger 53 is in the horizontal plane of the box-like member thereof and as shown is constituted as a horizontal lower wall 60 a trifle above the lower wall 55 of said box-like member, a downwardly and outwardly extending upper wall 61, opposite side walls, each represented 62, and a vertical outer end wall 63. The interior end of the elongated member of each outrigger 53 is secured, as by welding at 64, to the outer side wall of the box-like member thereof. A lug upon and extending downwardly from a lower surface of the horizontal lower wall 60 of the elongated member of each outrigger 53 is denoted 65.

The horizontal upper wall 54 of the box-like member of each outrigger 53 is provided with a vertical opening 66 in alined relation with the vertical opening 43 in the hub 41 of the upper anchoring member 40 at the same side of the crane, and vertical pivot pins snugly, removably received in alined openings 43, 66 and 43, 66, respectively, are each designated 67.

The box-like member of each outrigger 53 integrally supports, as by welding, a bearing plate 68 situated interiorly of said box-like member in spaced, parallel, adjacent relation to the horizontal lower wall 55 thereof. The bearing plate and lower wall of each outrigger are provided with vertical openings, denoted 69 and 70, respectively, in alined relation with the vertical openings 43, 51 and 66 in the upper and lower anchoring members and the upper wall 54 at the corresponding side of the crane, and vertical pivot pins snugly, removably received in alined openings 69, 70, 51 and 69, 70, 51, respectively, are each indicated 71.

A drive shaft 72, extending rearwardly from a motor 73 to drive mechanism for the rear wheels 16, passes freely through the opening 39 in the vertical rectangular plate or panel 35.

The longitudinal members or I-beams 11 of the frame 10 include downwardly extending portions 74 at the rear thereof, and a transverse bar 75 is secured, as by welding, to the lower ends of said downwardly extending portions. The opposite ends of the transverse bar 75 are in substantially longitudinally alined relation with the outer surfaces of the rear wheels 16, and said transverse bar provides a horizontal lower surface 76.

Said longitudinal members or I-beams also include downwardly extending portions 77 at the front thereof, and a transverse bar 78 is welded or otherwise secured to the lower ends of the downwardly extending portions 77. The transverse bar 78 is longitudinally alined with the transverse bar 75 and provides a horizontal lower surface 79.

Oblique reinforcing pieces, each indicated 80, are integral with the vertical body 17 and horizontal upper and lower flanges 18 and 19 of each longitudinal member or I-beam 11 and extend between said upper and lower flanges.

An intermediate portion of each longitudinal member or I-beam of the frame 10 and the vertical plate 31 integral therewith constitute a deep beam, and said deep beams, together with the horizontal floor and base plates 21 and 32, the vertical rectangular plate or panel 35, the upper and lower anchoring members and the reinforcing plates and pieces 20 and 80, comprise what may be termed a deep beam construction of said frame.

The outriggers 53 will be rotated to outward positions, as in Figs. 2, 3, 4, 5 and 7, and the lugs 65 thereon will be supported on blocks when said outriggers are to be put to use, and the outriggers will be rotated to inward positions, as in Fig. 1, when to be inactive. Said outriggers will be in perpendicular relation to the frame 10 when in operative position and parallel or alined relation with said frame when inoperative. As shown, means for fastening each outrigger in spaced relation to the frame when the outrigger is in working position is constituted as a rod 81 pivotally removably secured to and between said frame and outrigger. Each outrigger can be fastened in fixed relation to the frame when the outrigger is inoperative by inserting a pin into the vertical aperture 47 at the same side of the frame and causing said pin to enter an alined vertical aperture in the upper wall 54 of said outrigger. Or the outriggers can be fixed in operative and inoperative positions in some other manner which may be convenient or considered preferable.

The outriggers 53 are detachably assembled with the frame of the crane, as well as hingedly or pivotally supported thereon. Said outriggers can be detached from said frame merely by removing the pivot pins 67, 71, and when the outriggers are to be replaced in or on the frame all that is necessary is to situate their box-like members in proper position between the upper and lower anchoring members and insert said pivot pins. A rectangular slot 82 in a wall of the box-like member of each outrigger is for making the corresponding pivot pin 71 readily and easily accessible.

The rearward and forward transverse bars 75 and 78, as well as the outriggers 53, will be supported on blocks when the outrigger construction is in use. As shown, spaced blocks are situated beneath the opposite end portions of the rearward transverse bar 75 in engaged relation with its horizontal lower surface 76, and a single block is situated beneath the central portion of the forward transverse bar 78 in engaged relation with its horizontal lower surface 79. Together, the outriggers and rearward and forward transverse bars constitute or provide a construction and arrangement for accomplishing five point suspension or blocking of the frame of the crane.

The invention herein presents a number of novel and advantageous features and characteristics. A carrier mounted crane must be of relatively narrow width, and often of comparatively light weight, if it is to be permitted to travel on highways. The deep beam construction herein illustrated and described renders it possible to support the interior end portions of the outriggers 53 in closely spaced relation to each other, well within the confines of the front and rear wheels 14 and 16. Said deep beam construction also makes it possible to support outriggers at closer relation to the vertical axis for the revolvable platform or deck of a crane than can outriggers of a kind now generally in use be supported, and thus reduce both the mass and strength outrigger construction of necessity must have to perform its required service or function. But otherwise, outrigger construction made according to the invention can be both lighter and less expensive than can outrigger construction for the same general purpose heretofore known. The width or depth of the deep beam construction can be made greater or less, as may be appropriate. Increasing the width or depth will of course increase the strength, and vice versa. The outriggers 53, and the box-like members thereof, will be both massive and strong. Said box-like members and the upper and lower anchoring members, in cooperation with each other, will preclude relative vertical movement of the box-like members and said upper and lower anchoring members. The outriggers are assembled with the frame of the crane to be and remain horizontally alined therewith. The relatively heavy outriggers are bodily detachable from the frame and its comparatively lighter deep beam construction, thus to considerably reduce the overall weight of the crane. The outrigger construction permits direct passage of a drive shaft, such as 72, from a motor, such as 73, on or of a crane to driving mechanism for rear wheels, such as 16, on or of the crane. Such procedure is not possible in the instance of outrigger construction heretofore commonly in use. In summation, the outrigger construction of the present invention is radically different in various respects from and an improvement generally over outrigger construction of the prior art.

What is claimed is:

1. In a crane, front and rear wheels, a frame including a longitudinally extending member supported by the front and rear wheels, an upright element rigid with said longitudinally extending member and extending downwardly to position between and spaced from said front and rear wheels, there being an opening through said upright element, a drive shaft extending rearwardly through said opening, first and second sets of spaced, vertically alined, upper and lower anchoring members upon said frame at opposite sides, respectively, thereof, the upper anchoring member of each of said first and second sets providing a horizontal, downwardly facing surface and the lower anchoring member of each of the first and second sets providing a horizontal, upwardly facing surface, first and second outriggers at opposite sides, respectively, of the frame each including an inner end portion having horizontal, upper and lower surfaces, the upper and lower surfaces of the inner end portions of said first and second outriggers being situated between and slidably engaged with the downwardly and upwardly facing surfaces, respectively, of said first and second sets, respectively, and means hingedly supporting the interior end portions of said first and second outriggers upon the upper and lower anchoring members of the first and second sets, respectively, for inward and outward swinging movement of said outriggers in a horizontal plane between inoperative positions where exterior end portions of the outriggers are in adjacent relation to the frame and working positions where said exterior end portions of said outriggers are in remote relation to said frame.

2. In a crane, front and rear wheels, a frame including transversely spaced, first and second longitudinally extending members supported by said front and rear wheels, a horizontal floor plate upon said longitudinally extending members and between the front and rear wheels, a horizontal base plate below and in spaced relation to said first and second longitudinally extending members and between and spaced from said front and rear wheels, spaced apart, first and second elements secured between said first and second longitudinally extending members, respectively, and said horizontal base member, an upright element extending transversely of said frame at a location between said front and rear wheels and rigid with said longitudinally extending members and said floor and base plates, there being an opening through said upright element, a drive shaft extending rearwardly through said opening, first and second sets of spaced, vertically alined, upper and lower anchoring members upon said first and second longitudinally extending members, respectively, and at opposite sides, respectively, of said frame, the upper anchoring member of each of said first and second sets providing a horizontal, downwardly facing surface and the lower anchoring member of each of the first and second sets providing a horizontal, upwardly facing surface, first and second outriggers at opposite sides, respectively, of the frame each including an inner end portion having horizontal, upper and lower surfaces, the upper and lower surfaces of the inner end portions of said first and second outriggers being situated between and slidably engaged with the downwardly and upwardly facing surfaces, respectively, of said first and second sets, respectively, and means hingedly supporting the interior end portions of said first and second outriggers upon the upper and lower anchoring members of the first and second sets, respectively, for inward and outward swinging movement of said outriggers in a horizontal plane between inoperative positions where exterior end portions of the outriggers are in adjacent relation to the frame and working positions where said exterior end portions of said outriggers are in remote relation to said frame.

References Cited in the file of this patent
UNITED STATES PATENTS

| | | |
|---|---|---|
| 2,314,603 | Sorensen | Mar. 23, 1943 |
| 2,346,900 | Black | Apr. 18, 1944 |
| 2,370,661 | Hayes | Mar. 6, 1945 |
| 2,400,803 | Barnhart | May 21, 1946 |
| 2,609,217 | Hess | Sept. 2, 1952 |